United States Patent
Kondo et al.

(10) Patent No.: US 12,283,656 B2
(45) Date of Patent: *Apr. 22, 2025

(54) ION CONDUCTOR, POWER STORAGE DEVICE, AND METHOD FOR MANUFACTURING ION CONDUCTOR

(71) Applicant: NGK SPARK PLUG CO., LTD., Nagoya (JP)

(72) Inventors: Ayako Kondo, Nagoya (JP); Daisuke Shishihara, Nagoya (JP); Yuki Takeuchi, Nagoya (JP); Suguru Miyamoto, Nagoya (JP); Hideaki Hikosaka, Nagoya (JP); Hidetoshi Mizutani, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 772 days.

This patent is subject to a terminal disclaimer.

(21) Appl. No.: 17/431,939

(22) PCT Filed: May 13, 2019

(86) PCT No.: PCT/JP2019/018881
§ 371 (c)(1),
(2) Date: Aug. 18, 2021

(87) PCT Pub. No.: WO2020/170463
PCT Pub. Date: Aug. 27, 2020

(65) Prior Publication Data
US 2021/0384551 A1   Dec. 9, 2021

(30) Foreign Application Priority Data
Feb. 19, 2019   (JP) .................. 2019-027067

(51) Int. Cl.
*H01M 10/0562*   (2010.01)
*H01M 50/443*   (2021.01)
(Continued)

(52) U.S. Cl.
CPC ..... *H01M 10/0562* (2013.01); *H01M 50/443* (2021.01); *H01B 1/122* (2013.01);
(Continued)

(58) Field of Classification Search
None
See application file for complete search history.

(56) References Cited

U.S. PATENT DOCUMENTS

2011/0052994 A1   3/2011   Harada et al.
2017/0222244 A1   8/2017   Kim et al.
(Continued)

FOREIGN PATENT DOCUMENTS

EP   3 364 489 A1   8/2018
EP   3 796 337 A1   3/2021
(Continued)

OTHER PUBLICATIONS

Kim et al. "Hybrid solid electrolyte with the combination of Li7La3Zr2O12 ceramic and ionic liquid for high voltage pseudo-solid-state Li-ion batteries" Journal of Materials Chemistry A; Issue 43, 2016, pp. 17025-17032.*

(Continued)

*Primary Examiner* — Laura Weiner
(74) *Attorney, Agent, or Firm* — Stites & Harbison, PLLC; Jeffrey A. Haeberlin; Trevor T. Graves (57) ABSTRACT

An ion conductor exhibiting high lithium ion conductivity in the form of a molded product without firing is provided. The ion conductor contains an ion conductive powder having lithium ion conductivity and an ionic liquid having lithium ion conductivity. The ionic liquid has an average thickness of 5 nm or more.

7 Claims, 9 Drawing Sheets

| SAMPLE No. | LITHIUM ION CONDUCTIVE POWDER (LLZ-MgSr) | PARTICLE SIZE DISTRIBUTION D50 (μm) | COMPOSITION (vol%) | | | FORM | AVERAGE THICKNESS OF IONIC LIQUID t1 (nm) | POROSITY (%) | LITHIUM ION CONDUCTIVITY (S/cm) |
|---|---|---|---|---|---|---|---|---|---|
| | | | LLZ-MgSr | IONIC LIQUID | BINDER | | | | |
| S1  | A | 67.9  | 100 | 0  | -  | COMPACT | 0     | 25.8 | $1.0 \times 10^{-6}$ |
| S2  | A | 67.9  | 97  | 3  | -  | COMPACT | 40.0  | 14.5 | $2.0 \times 10^{-4}$ |
| S3  | A | 67.9  | 93  | 7  | -  | COMPACT | 80.0  | 12.1 | $5.0 \times 10^{-4}$ |
| S4  | A | 67.9  | 84  | 16 | -  | COMPACT | 210.0 | 5.5  | $5.0 \times 10^{-4}$ |
| S5  | B | 10.1  | 100 | 0  | -  | COMPACT | 0     | 23.0 | $8.0 \times 10^{-7}$ |
| S6  | B | 10.1  | 97  | 3  | -  | COMPACT | 7.5   | 21.2 | $7.0 \times 10^{-5}$ |
| S7  | B | 10.1  | 93  | 7  | -  | COMPACT | 15.0  | 19.8 | $4.0 \times 10^{-4}$ |
| S8  | C | 3.08  | 100 | 0  | -  | COMPACT | 0     | 28.6 | $1.0 \times 10^{-8}$ |
| S9  | C | 3.08  | 97  | 3  | -  | COMPACT | 3.0   | 25.5 | $7.0 \times 10^{-6}$ |
| S10 | C | 3.08  | 93  | 7  | -  | COMPACT | 5.0   | 13.1 | $7.0 \times 10^{-5}$ |
| S11 | C | 3.08  | 84  | 16 | -  | COMPACT | 10.0  | 17.1 | $7.0 \times 10^{-5}$ |
| S12 | D | 0.87  | 100 | 0  | -  | COMPACT | 0     | 34.8 | $6.0 \times 10^{-8}$ |
| S13 | D | 0.87  | 79  | 21 | -  | COMPACT | 28.3  | 17.5 | $5.0 \times 10^{-4}$ |
| S14 | D | 0.87  | 66  | 34 | -  | COMPACT | 56.6  | 24.8 | $2.0 \times 10^{-3}$ |
| S15 | E | -     | 87  | 13 | -  | COMPACT | 19.3  | 14.5 | $3.0 \times 10^{-4}$ |
| S16 | E | -     | 77  | 11 | 12 | SHEET   | 19.3  | 29.8 | $1.0 \times 10^{-4}$ |

(51) Int. Cl.
  *H01B 1/12* (2006.01)
  *H01M 4/62* (2006.01)
  *H01M 10/0525* (2010.01)
  *H01M 50/403* (2021.01)
  *H01M 50/414* (2021.01)
  *H01M 50/431* (2021.01)

(52) U.S. Cl.
  CPC .......... *H01M 4/62* (2013.01); *H01M 10/0525* (2013.01); *H01M 50/403* (2021.01); *H01M 50/414* (2021.01); *H01M 50/431* (2021.01); *H01M 2300/0045* (2013.01); *H01M 2300/0071* (2013.01); *H01M 2300/0091* (2013.01)

(56) References Cited

U.S. PATENT DOCUMENTS

| | | |
|---|---|---|
| 2018/0062166 A1 | 3/2018 | Sasaki |
| 2018/0277891 A1 | 9/2018 | Mimura et al. |
| 2019/0312304 A1 | 10/2019 | Uesugi et al. |
| 2021/0091409 A1 | 3/2021 | Mimura et al. |

FOREIGN PATENT DOCUMENTS

| | | | |
|---|---|---|---|
| JP | 2016-040767 | A | 3/2016 |
| JP | 2016-219223 | A | 12/2016 |
| JP | 2017-130264 | * | 7/2017 |
| KR | 2017-0076246 | A | 7/2017 |
| KR | 2019-0007028 | A | 1/2019 |
| WO | 2017-099248 | A1 | 6/2017 |
| WO | 2018-110133 | A1 | 6/2018 |

OTHER PUBLICATIONS

European Patent Office, Extended European Search Report issued in corresponding Application No. EP 19916219.9, dated Oct. 7, 2022.
Hyun Woo Kim et al: "Hybrid solid electrolyte with the combination of Li7La3Zr2O12 ceramic and ionic liquid for high voltage pseudo-solid-state Li-ion batteries", Journal of Materials Chemistry A, vol. 4, No. 43, Jan. 1, 2016, pp. 17025-17032. Relevance: See EESR.
Korean Intellectual Property Office, Office Action (Request for the Submission of an Opinion) issued in corresponding Application No. KR 10-2021-7026148 on Jan. 25, 2023.
Japan Patent Office, International Search Report issued in corresponding Application No. PCT/JP2019/018881, mailed Jul. 16, 2019.

* cited by examiner

| SAMPLE No. | LITHIUM ION CONDUCTIVE POWDER (LLZ-MgSr) | PARTICLE SIZE DISTRIBUTION D50 (μm) | COMPOSITION (vol%) | | | FORM | AVERAGE THICKNESS OF IONIC LIQUID t1 (nm) | POROSITY (%) | LITHIUM ION CONDUCTIVITY (S/cm) |
|---|---|---|---|---|---|---|---|---|---|
| | | | LLZ-MgSr | IONIC LIQUID | BINDER | | | | |
| S1 | A | 67.9 | 100 | 0 | - | COMPACT | 0 | 25.8 | $1.0 \times 10^{-6}$ |
| S2 | A | 67.9 | 97 | 3 | - | COMPACT | 40.0 | 14.5 | $2.0 \times 10^{-4}$ |
| S3 | A | 67.9 | 93 | 7 | - | COMPACT | 80.0 | 12.1 | $5.0 \times 10^{-4}$ |
| S4 | A | 67.9 | 84 | 16 | - | COMPACT | 210.0 | 5.5 | $5.0 \times 10^{-4}$ |
| S5 | B | 10.1 | 100 | 0 | - | COMPACT | 0 | 23.0 | $8.0 \times 10^{-7}$ |
| S6 | B | 10.1 | 97 | 3 | - | COMPACT | 7.5 | 21.2 | $7.0 \times 10^{-5}$ |
| S7 | B | 10.1 | 93 | 7 | - | COMPACT | 15.0 | 19.8 | $4.0 \times 10^{-4}$ |
| S8 | C | 3.08 | 100 | 0 | - | COMPACT | 0 | 28.6 | $1.0 \times 10^{-8}$ |
| S9 | C | 3.08 | 97 | 3 | - | COMPACT | 3.0 | 25.5 | $7.0 \times 10^{-8}$ |
| S10 | C | 3.08 | 93 | 7 | - | COMPACT | 5.0 | 13.1 | $7.0 \times 10^{-5}$ |
| S11 | C | 3.08 | 84 | 16 | - | COMPACT | 10.0 | 17.1 | $7.0 \times 10^{-5}$ |
| S12 | D | 0.87 | 100 | 0 | - | COMPACT | 0 | 34.8 | $6.0 \times 10^{-8}$ |
| S13 | D | 0.87 | 79 | 21 | - | COMPACT | 28.3 | 17.5 | $5.0 \times 10^{-4}$ |
| S14 | D | 0.87 | 66 | 34 | - | COMPACT | 56.6 | 24.8 | $2.0 \times 10^{-3}$ |
| S15 | E | - | 87 | 13 | - | COMPACT | 19.3 | 14.5 | $3.0 \times 10^{-4}$ |
| S16 | E | - | 77 | 11 | 12 | SHEET | 19.3 | 29.8 | $1.0 \times 10^{-4}$ |

ION CONDUCTOR, POWER STORAGE DEVICE, AND METHOD FOR MANUFACTURING ION CONDUCTOR

TECHNICAL FIELD

The technique disclosed in the present specification relates to an ion conductor.

BACKGROUND ART

In recent years, an increasing demand has arisen for high-performance batteries in association with, for example, the prevalence of electronic apparatuses (e.g., personal computers and cellular phones) and electric-powered automobiles, and the growing use of natural energy such as sunlight or wind power. In particular, expectations are placed on the utilization of a complete-solid lithium ion secondary battery in which all battery elements are formed of a solid (hereinafter the battery may be referred to as a "complete-solid battery"). The complete-solid battery is free from, for example, leakage of an organic electrolytic solution or flashing, and thus is safer than a conventional lithium ion secondary battery containing an organic electrolytic solution prepared by dissolution of a lithium salt in an organic solvent. Since the complete-solid battery can be provided with a simple casing, the battery achieves an increase in energy density per unit mass or unit volume.

One known ion conductor forming a solid electrolyte layer or an electrode of such a complete-solid battery contains, for example, an ion conductive powder having a garnet-type structure or a garnet-like structure containing at least Li (lithium), La (lanthanum), Zr (zirconium), and O (oxygen). One known ion conductive powder contained in such an ion conductor is, for example, a powder of $Li_7La_3Zr_2O_{12}$ (hereinafter will be referred to as "LLZ") or a powder of a product prepared by substitution of LLZ with at least one element of Mg (magnesium) and A (in which A represents at least one element selected from the group consisting of Ca (calcium), Sr (strontium), and Ba (barium)) (e.g., a product prepared by substitution of LLZ with elemental Mg and Sr (hereinafter the product will be referred to as "LLZ-MgSr")) (see, for example, Patent Literature 1). Hereinafter, such an ion conductive powder will be referred to as "LLZ ion conductive powder."

CITATION LIST

Patent Literature

Patent Literature 1: Japanese Patent Application Laid-Open (kokai) No. 2016-40767

SUMMARY OF INVENTION

Technical Problem

An LLZ ion conductive powder exhibits relatively low lithium ion conductivity in the form of a molded product (compact) formed by press molding of the powder, since particles are in point contact with one another and thus the electric resistance between particles is high. The lithium ion conductivity can be increased by firing the LLZ ion conductive powder at a high temperature. However, since high-temperature firing of the powder causes warpage or deformation, difficulty is encountered in producing a large-size battery. Also, high-temperature firing of the powder may cause reaction of the powder with, for example, an electrode active material to form a layer of high resistance, leading to a reduction in lithium ion conductivity.

Such a problem is not limited to an ion conductor containing an LLZ ion conductive powder, or an ion conductor used in a solid electrolyte layer or an electrode of a complete-solid battery. Thus, such a problem is common with an ion conductor having lithium ion conductivity.

The present specification discloses a technique capable of solving the aforementioned problems.

Solution to Problem

The technique disclosed in the present specification can be implemented in, for example, the following modes.

(1) The present specification discloses an ion conductor including an ion conductive powder having lithium ion conductivity. The ion conductor further includes an ionic liquid having lithium ion conductivity, and the ionic liquid has an average thickness of 5 nm or more. The ion conductor can exhibit high lithium ion conductivity as a form of a compact produced without high-temperature firing.

(2) The ion conductor may have a porosity of 30% or less. In such a case, the ion conductor can exhibit further improved lithium ion conductivity.

(3) In the ion conductor, the ion conductive powder may have a garnet structure or a garnet-like structure containing at least Li, La, Zr, and O. The ion conductive powder having a garnet structure or a garnet-like structure containing at least Li, La, Zr, and O is relatively hard. However, even when the relatively hard ion conductive powder is used, the ion conductor can exhibit high lithium ion conductivity as a form of a compact produced without high-temperature firing.

(4) The ion conductor may have a lithium ion conductivity of $1.0 \times 10^{-5}$ S/cm or more at 25° C. According to the ion conductor, a lithium ion conductivity as high as $1.0 \times 10^{-5}$ S/cm or more can be achieved.

(5) The ion conductor may further include a binder, and may be in the form of a sheet. In such a case, the moldability and handling property of the ion conductor can be improved while the lithium ion conductivity is enhanced.

(6) The present specification also discloses a power storage device including a solid electrolyte layer, a cathode, and an anode. At least one of the solid electrolyte layer, the cathode, and the anode contains the ion conductor as described above. According to the power storage device, the lithium ion conductivity of at least one of the solid electrolyte layer, the cathode, and the anode can be improved. Thus, the electric performance of the power storage device can be improved.

(7) The present specification also discloses a method for producing an ion conductor, the method including a mixing step of mixing an ion conductive powder with an ionic liquid, to thereby prepare a powder compound (i.e., a powder-liquid mixed material); and after the mixing step, a film-formation step of forming a sheet-form ion conductor from a mixture of the powder compound and a binder. According to the ion conductor production method, the surface of the ion conductive powder can be covered with the ionic liquid, thereby preventing formation of a resistive layer on the surface of the ion conductive powder, and in turn preventing an increase in the resistance of the ion conductor which would otherwise be caused by the resistive layer.

The technique disclosed in the present specification can be implemented in various modes; for example, an ion conductor, a lithium battery including the ion conductor, a power storage device including the ion conductor, and a production method therefor.

DESCRIPTION OF EMBODIMENTS

A. Embodiment

A-1. Structure of Complete-Solid Battery 102
(Entire Structure)

Figure 1:
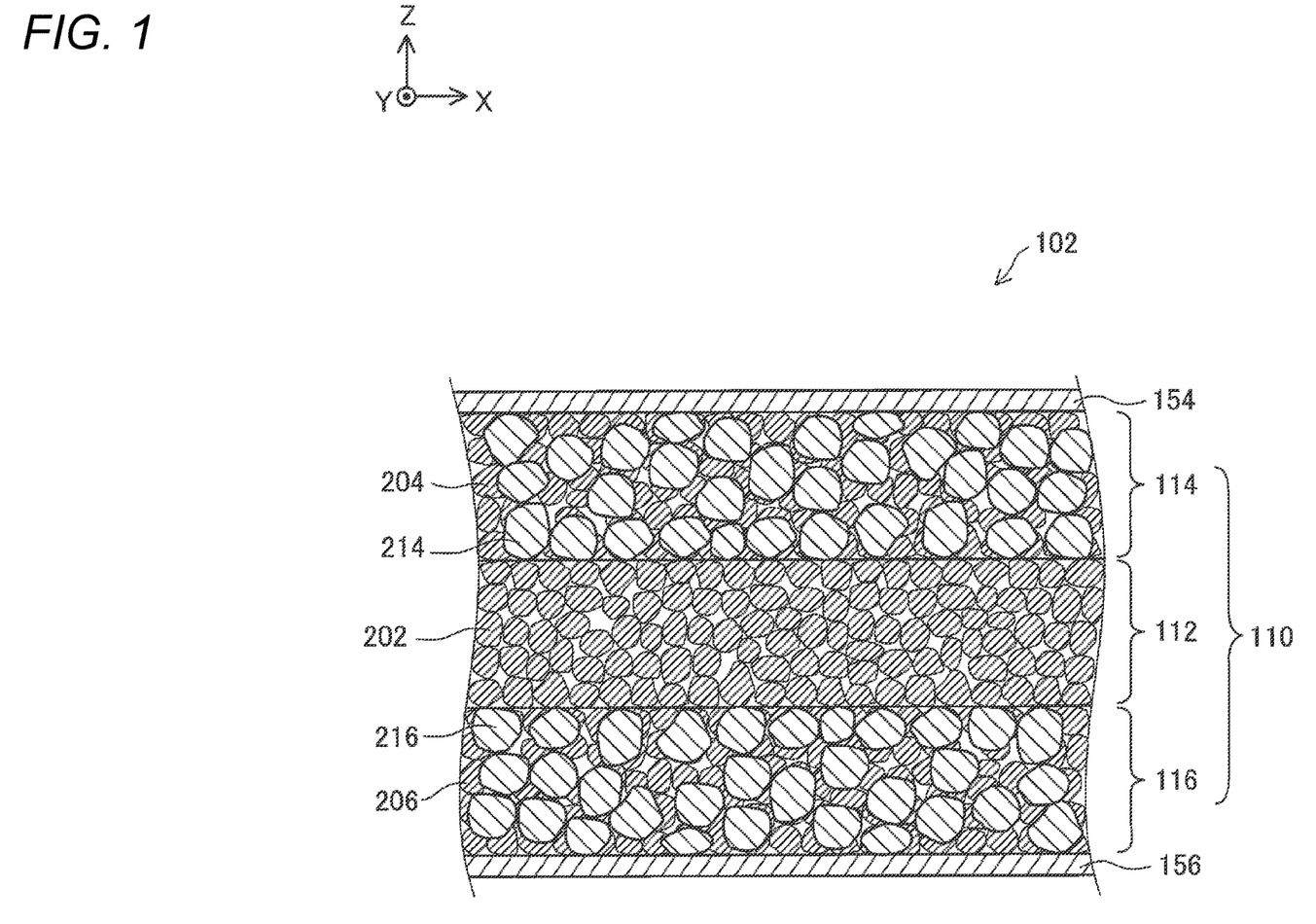
FIG. 1 Explanatory view schematically showing a cross section of a complete-solid lithium ion secondary battery 102 according to an embodiment.

FIG. 1 is an explanatory view schematically showing a cross section of a complete-solid lithium ion secondary battery (hereinafter will be referred to as "complete-solid battery") 102 according to the present embodiment. FIG. 1 shows mutually orthogonal X-axis, Y-axis, and Z-axis for specifying respective directions. In the present specification, for the sake of convenience, the positive Z-axis direction is called the "upward direction," and the negative Z-axis direction is called the "downward direction."

The complete-solid battery 102 includes a battery body 110, a cathode-side collector member 154 disposed on one side (upper side) of the battery body 110, and an anode-side collector member 156 disposed on the other side (lower side) of the battery body 110. Each of the cathode-side collector member 154 and the anode-side collector member 156 is an electrically conductive member having an approximately flat-plate shape, and is formed of, for example, an electrically conductive metal material selected from among stainless steel, Ni (nickel), Ti (titanium), Fe (iron), Cu (copper), Al (aluminum), and alloys of these, or a carbon material. In the following description, the cathode-side collector member 154 and the anode-side collector member 156 may be collectively referred to as "collector members."
(Structure of Battery Body 110)

The battery body 110 is a lithium ion secondary battery body in which all battery elements are formed of a solid. As used herein, the phrase "all battery elements are formed of a solid" refers to the case where the skeletons of all battery elements are formed of a solid, but does not exclude the case where, for example, any of the skeletons is impregnated with a liquid. The battery body 110 includes a cathode 114, an anode 116, and a solid electrolyte layer 112 disposed between the cathode 114 and the anode 116. In the following description, the cathode 114 and the anode 116 may be collectively referred to as "electrodes." The battery body 110 corresponds to the power storage device appearing in CLAIMS.
(Structure of Solid Electrolyte Layer 112)

The solid electrolyte layer 112 is a member having an approximately flat-plate shape and contains a lithium ion conductor 202 which is a solid electrolyte. The structure of the lithium ion conductor 202 contained in the solid electrolyte layer 112 will be described in detail below.
(Structure of Cathode 114)

The cathode 114 is a member having an approximately flat-plate shape and contains a cathode active material 214. The cathode active material 214 is, for example, S (sulfur), $TiS_2$, $LiCoO_2$, $LiMn_2O_4$, or $LiFePO_4$. The cathode 114 contains a lithium ion conductor 204 which is a solid electrolyte serving as a lithium-ion-conducting aid. The cathode 114 may further contain an electron-conducting aid (e.g., electrically conductive carbon, Ni (nickel), Pt (platinum), or Ag (silver)).
(Structure of Anode 116)

The anode 116 is a member having an approximately flat-plate shape and contains an anode active material 216. The anode active material 216 is, for example, Li metal, Li—Al alloy, $Li_4Ti_5O_{12}$, carbon, Si (silicon), or SiO. The anode 116 contains a lithium ion conductor 206 which is a solid electrolyte serving as a lithium-ion-conducting aid. The cathode 116 may further contain an electron-conducting aid (e.g., electrically conductive carbon, Ni, Pt, or Ag).

A-2. Structure of Lithium Ion Conductor

Next will be described the structure of the lithium ion conductor 202 contained in the solid electrolyte layer 112. The lithium ion conductor 204 contained in the cathode 114 and the lithium ion conductor 206 contained in the anode 116 have the same structure as that of the lithium ion conductor 202 contained in the solid electrolyte layer 112. Thus, description of the conductors 204 and 206 is omitted.

In the present embodiment, the lithium ion conductor 202 contained in the solid electrolyte layer 112 contains an ion conductive powder having lithium ion conductivity. More specifically, the lithium ion conductor 202 contains the aforementioned LLZ ion conductive powder (i.e., ion conductive powder having a garnet structure or a garnet-like structure containing at least Li, La, Zr, and O and, such as LLZ or LLZ-MgSr).

In the present embodiment, the lithium ion conductor 202 further contains an ionic liquid having lithium ion conductivity. The ionic liquid having lithium ion conductivity is, for example, an ionic liquid containing a lithium salt dissolved therein. The ionic liquid contains only cationic and anionic species, and is in the form of liquid at ambient temperature. In the present embodiment, the ionic liquid contained in the lithium ion conductor 202 has an average thickness t1 of 5 nm or more. A method for determining the average thickness t1 of the ionic liquid will be described below.

Examples of the aforementioned lithium salt include lithium tetrafluoroborate ($LiBF_4$), lithium hexafluorophosphate ($LiPF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$) (hereinafter referred to as "Li-TFSI"), lithium bis(fluorosulfonyl)imide ($LiN(SO_2F)_2$), and lithium bis(pentafluoroethanesulfonyl)imide ($LiN(SO_2C_2F_5)_2$).

The aforementioned ionic liquid contains a cation selected from, for example, the following cations:
ammonium cations such as butyltrimethylammonium and trimethylpropylammonium;

imidazolium cations such as 1-ethyl-3-methylimidazolium and 1-butyl-3-methylimidazolium;

piperidinium cations such as 1-butyl-1-methylpiperidinium and 1-methyl-1-propylpiperidinium;

pyridinium cations such as 1-butyl-4-methylpyridinium and 1-ethylpyridinium;

pyrrolidinium cations such as 1-butyl-1-methylpyrrolidinium and 1-methyl-1-propylpyrrolidinium;

sulfonium cations such as trimethylsulfonium and triethylsulfonium;

phosphonium cations; and morpholinium cations.

The aforementioned ionic liquid contains an anion selected from, for example, the following anions:

halide anions such as $Cl^-$ and $Br^-$;

borate anions such as $BF_4^-$;

amine anions such as $(NC)_2N^-$, $(CF_3SO_2)_2N^-$, and $(FSO_2)_2N^-$;

sulfate and sulfonate anions such as $CH_3SO_4^-$ and $CF_3SO_3^-$; and phosphate anions such as $PF_6^-$.

More specifically, the aforementioned ionic liquid contains, for example, butyltrimethylammonium bis(trifluoromethanesulfonyl)imide, trimethylpropylammonium bis(trifluoromethanesulfonyl)imide, 1-ethyl-3-methylimidazolium bis(fluorosulfonyl)imide (hereinafter referred to as "EMI-FSI"), 1-ethyl-3-methylimidazolium tetrafluoroborate, 1-methyl-1-propylpyrrolidinium bis(trifluoromethanesulfonyl)imide, or 1-ethyl-3-methylimidazolium bis(trifluoromethanesulfonyl)imide.

The lithium ion conductor 202 of the present embodiment is not a sintered body formed through high-temperature firing. Thus, the lithium ion conductor 202 of the present embodiment contains hydrocarbon. More specifically, the ionic liquid forming the lithium ion conductor 202 of the present embodiment contains hydrocarbon. The presence of hydrocarbon contained in the lithium ion conductor 202 (ionic liquid) can be determined through one technique selected from, for example, NMR (nuclear magnetic resonance), GC-MS (gas chromatography-mass spectrometry), and FT-IR (Fourier-transform infrared spectroscopy) or a combination of two or more of these techniques.

As described above, the lithium ion conductor 202 of the present embodiment contains the ionic liquid having lithium ion conductivity in addition to the LLZ ion conductive powder. The ionic liquid has an average thickness t1 of 5 nm or more, and the lithium ion conductor 202 exhibits high lithium ion conductivity (specifically, a lithium ion conductivity of $1.0 \times 10^{-5}$ S/cm or more at 25° C.) in the form of a molded product (compact) formed by press molding. The reason why the lithium ion conductor 202 of the present embodiment exhibits such a high lithium ion conductivity has not clearly been elucidated, but is considered as follows.

The LLZ ion conductive powder is harder than another oxide-based lithium ion conductor or a non-oxide-based lithium ion conductor (e.g., a sulfide-based lithium ion conductor). Thus, when the LLZ ion conductive powder is formed into a molded product (compact) by press molding, the compact exhibits relatively low lithium ion conductivity, since particles are in point contact with one another, and the resistance between particles is high. Although the lithium ion conductivity can be increased by firing the LLZ ion conductive powder at a high temperature, difficulty is encountered in producing a large-size battery since high-temperature firing of the powder causes warpage or deformation. Also, high-temperature firing of the powder may cause reaction of the powder with, for example, an electrode active material to form a layer of high resistance, leading to a reduction in lithium ion conductivity. However, the lithium ion conductor 202 of the present embodiment contains the ionic liquid having lithium ion conductivity in addition to the LLZ ion conductive powder. Furthermore, the ionic liquid has a relatively large thickness; i.e., an average thickness t1 of 5 nm or more. Therefore, when the lithium ion conductor is formed into a compact through press molding, the ionic liquid, which functions as a lithium ion conduction path, is present at particle boundaries of the LLZ ion conductive powder throughout the entire compact, and thus lithium ion conductivity is improved at the particle boundaries, which conceivably results in an improvement in the lithium ion conductivity of the lithium ion conductor 202.

The average thickness t1 of the ionic liquid contained in the lithium ion conductor 202 is more preferably 15 nm or more. In such a case, the lithium ion conductivity of the lithium ion conductor 202 can be further improved. The average thickness t1 of the ionic liquid contained in the lithium ion conductor 202 is preferably one-fifth or less the average particle size of the ion conductive powder contained in the lithium ion conductor 202.

In the present embodiment, the lithium ion conductor 202 preferably has a porosity of 30% or less. In such a case, a lithium ion conduction path can be sufficiently secured in the lithium ion conductor 202, and the lithium ion conductivity of the lithium ion conductor 202 can be more improved. The porosity of the lithium ion conductor 202 is more preferably 25% or less. In such a case, a lithium ion conduction path can be further sufficiently secured in the lithium ion conductor 202, and the lithium ion conductivity of the lithium ion conductor 202 can be further improved.

The lithium ion conductor 202 of the present embodiment contains a binder in addition to the LLZ ion conductive powder and the ionic liquid. The lithium ion conductor 202 may be in the form of a sheet. Examples of the binder include polyvinylidene fluoride (PVDF), a copolymer of polyvinylidene fluoride (PVDF) and hexafluoropropylene (HFP) (hereinafter the copolymer will be referred to as "PVDF-HFP"), polytetrafluoroethylene (PTFE), polyimide, polyamide, silicone (polysiloxane), styrene-butadiene rubber (SBR), acrylic resin (PMMA), and polyethylene oxide (PEO). In such a case, the moldability and handling property of the lithium ion conductor 202 can be improved while improving the lithium ion conductivity of the lithium ion conductor 202.

A-3. Production Method for Complete-Solid Battery 102

Figure 2:
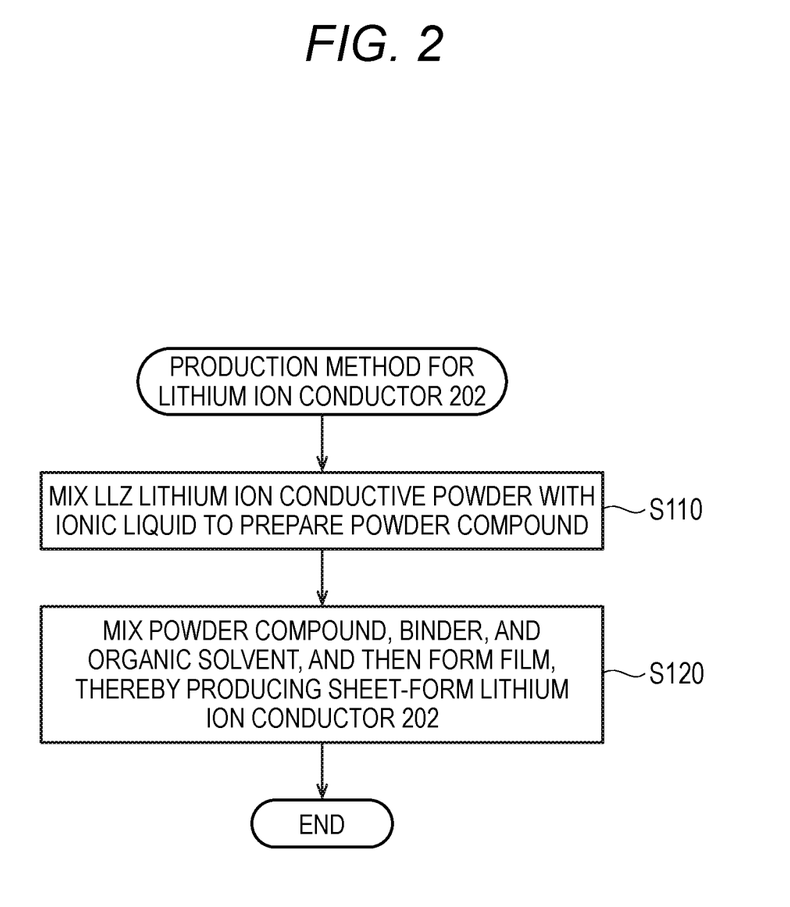
FIG. 2 Flowchart showing an exemplary production method for a lithium ion conductor 202 according to the embodiment.

Next will be described an exemplary production method for the complete-solid battery 102 of the present embodiment. Firstly, the lithium ion conductor 202, which forms the solid electrolyte layer 112, is prepared. FIG. 2 is a flowchart showing an exemplary production method for the lithium ion conductor 202 according to the present embodiment. The production method will now be described by taking as an example the case where the lithium ion conductor 202 contains a lithium ion conductive powder, an ionic liquid, and a binder and is in the form of a sheet. Firstly, an LLZ ion conductive powder and an ionic liquid having lithium ion conductivity are provided, and these materials are mixed in predetermined proportions, to thereby prepare a powder compound (S110). Step S110 corresponds to the mixing step appearing in CLAIMS.

Subsequently, the powder compound is mixed with a binder and an organic solvent, and the resultant mixture is formed into the sheet-form lithium ion conductor 202 (solid electrolyte layer 112) (S120). The sheet-form lithium ion conductor may be subjected to press molding at a predetermined pressure. Step S120 corresponds to the film-formation step appearing in CLAIMS.

Separately, the cathode 114 and the anode 116 are formed. Specifically, a powder of the cathode active material 214, the aforementioned powder compound, and optionally an electron-conducting aid powder, a binder, and an organic solvent are mixed in predetermined proportions, and the resultant mixture is subjected to molding, to thereby form the cathode 114. Meanwhile, a powder of the anode active material 216, the aforementioned powder compound, and optionally an electron-conducting aid powder, a binder, and an organic solvent are mixed together, and the resultant mixture is subjected to molding, to thereby form the anode 116.

Subsequently, the cathode-side collector member 154, the cathode 114, the solid electrolyte layer 112, the anode 116, and the anode-side collector member 156 are stacked in this order, and then integrated together by pressing. The complete-solid battery 102 having the aforementioned structure is produced through the above-described process.

As described above, the production method for the lithium ion conductor 202 of the present embodiment includes a step (S110) of preparing a powder compound by mixing a lithium ion conductive powder and an ionic liquid, and then a step of forming the sheet-form lithium ion conductor 202 from a mixture of a binder and the powder compound. Therefore, the surface of the lithium ion conductive powder can be covered with the ionic liquid in a slurry, thereby preventing formation of a resistive layer on the surface of the lithium ion conductive powder in the slurry, and in turn preventing an increase in the resistance of the lithium ion conductor 202 caused by the resistive layer.

Instead of producing the lithium ion conductor 202 through the aforementioned method, the lithium ion conductor 202 in the form of compact may be produced through a method involving press molding of a powder compound of an LLZ ion conductive powder and an ionic liquid at a predetermined pressure.

A-4. Method for Analyzing Lithium Ion Conductor

Figure 3:
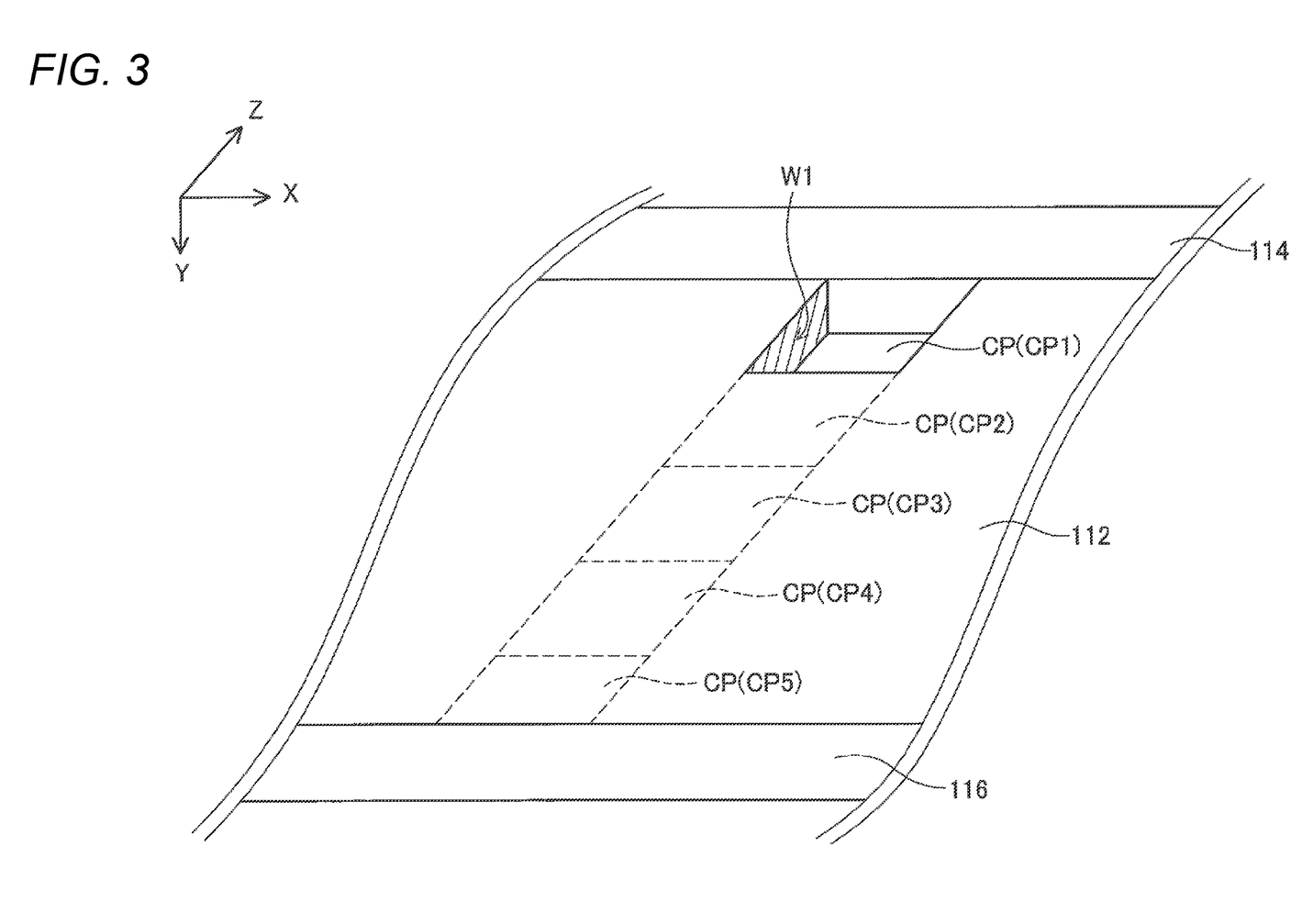
FIG. 3 Explanatory view showing a method for determining the average thickness t1 of an ionic liquid.
Figure 4:
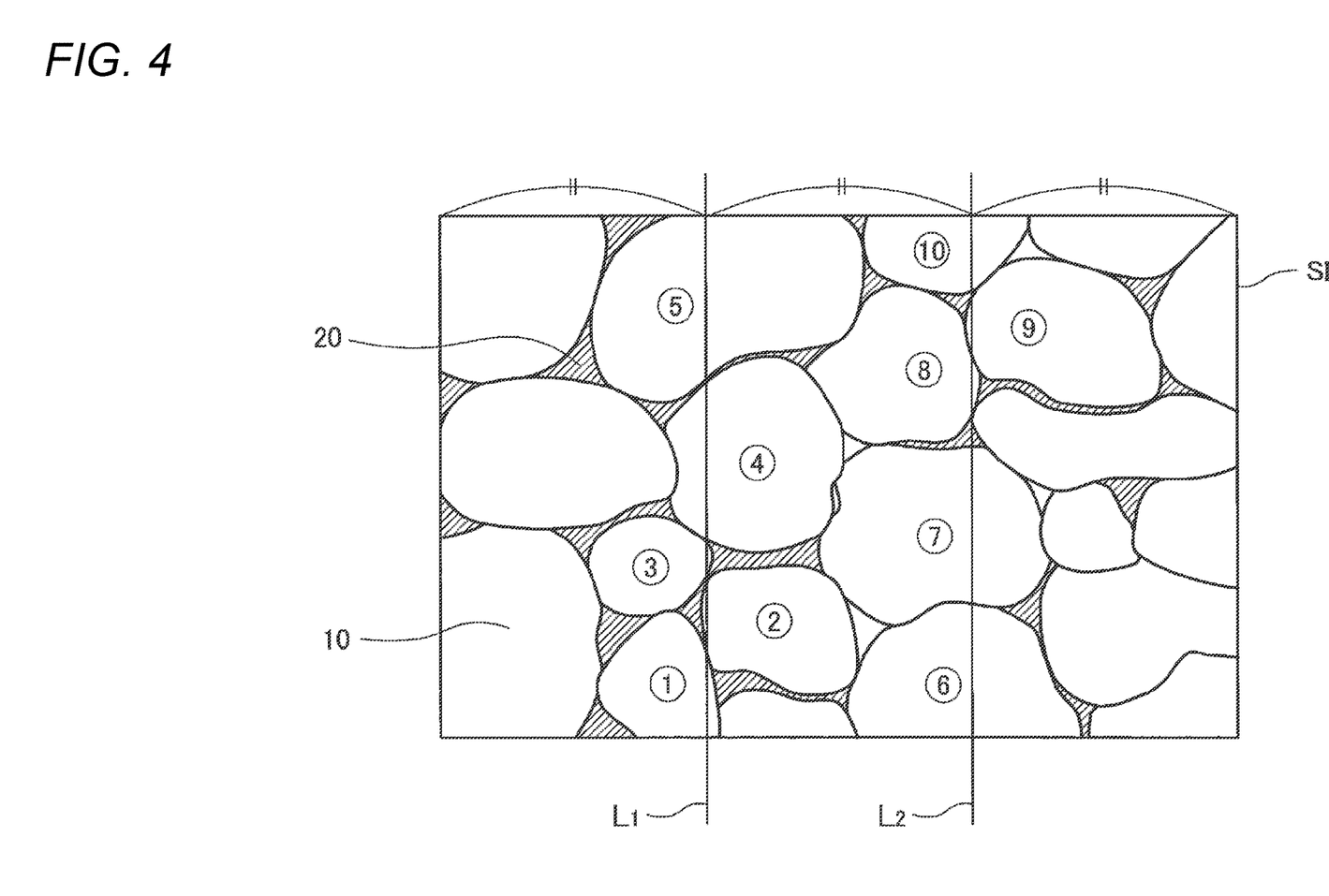
FIG. 4 Explanatory view showing the method for determining the average thickness t1 of the ionic liquid.
Figure 5:
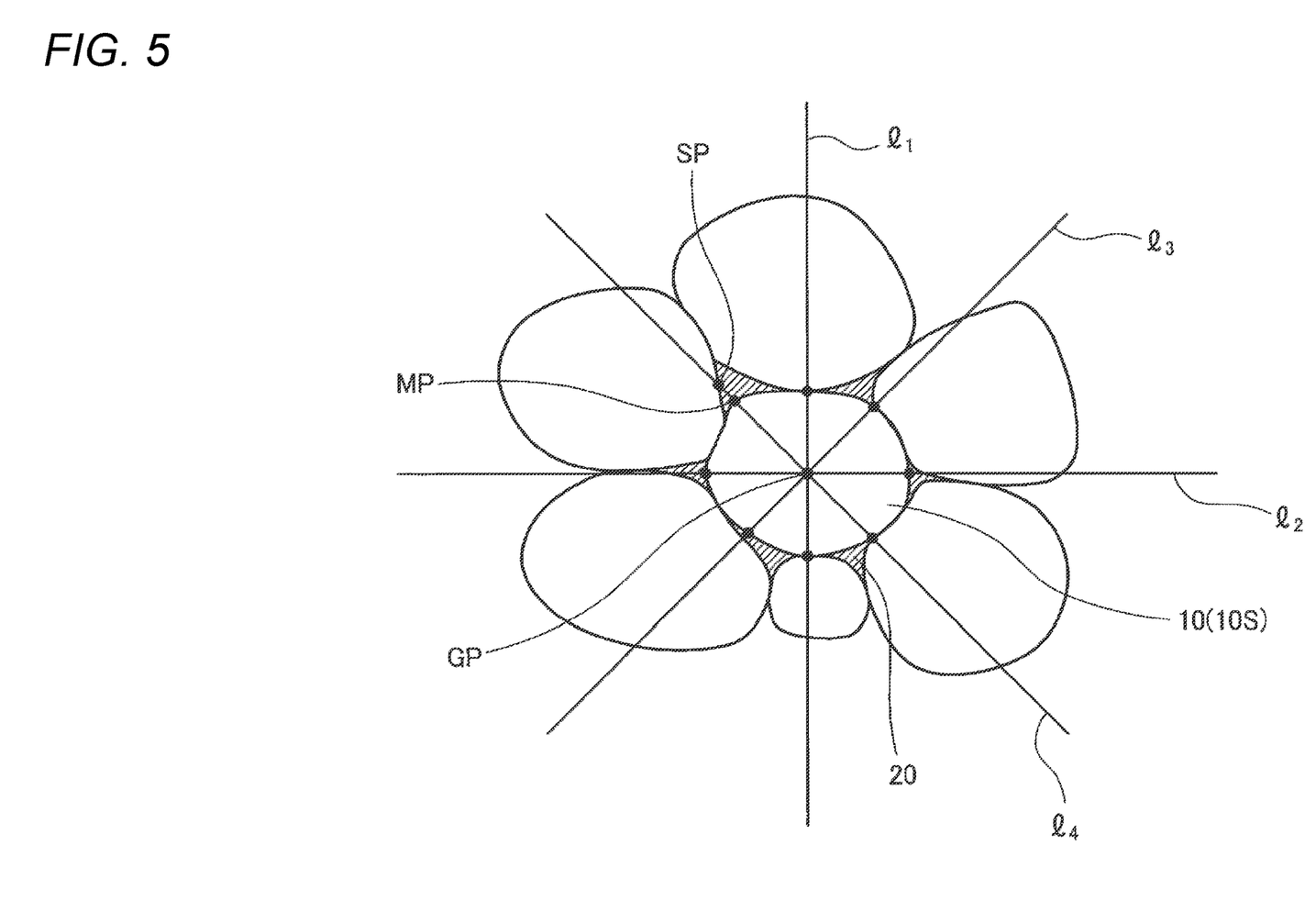
FIG. 5 Explanatory view showing the method for determining the average thickness t1 of the ionic liquid.

A-4-1. Method for Determining Average Thickness t1 of Ionic Liquid Contained in Lithium Ion Conductor The average thickness t1 of the ionic liquid contained in the lithium ion conductor is determined as described below. Now will be described a method for determining the average thickness t1 of the ionic liquid contained in the lithium ion conductor forming the solid electrolyte layer 112. This method can be applied to determination of the average thickness t1 of an ionic liquid contained in another lithium ion conductor. FIGS. 3 to 5 are explanatory views showing the method for determining the average thickness t1 of the ionic liquid. Firstly, as shown in FIG. 3, a sample is cooled to −100° C., and a test piece having dimensions of 5 mm or less×5 mm or less×3 mm or less (thickness) (i.e., a test piece that enables observation of the entire cross section of the solid electrolyte layer 112 in a thickness direction (Z-axis direction)) is cut out of the sample. The test piece (including the cross section of the solid electrolyte layer 112) is subjected to FIB processing in a thickness direction from one end of the solid electrolyte layer 112 (e.g., from the boundary between the layer 112 and the cathode 114), to thereby provide dents CP (dents CP1 to CP5 shown in FIG. 3) each having dimensions of 50 μm×50 μm×20 μm (thickness). In the case where a dent CP (dent CP5 shown in FIG. 3) extends outside the solid electrolyte layer 112 at the other end of the solid electrolyte layer 112 (e.g., at the boundary between the layer 112 and the anode 116), the below-described observation in the dent CP is performed only at a portion of the solid electrolyte layer 112.

While the wall W1 of each dent CP is cooled at −100° C., the wall W1 is observed under an SEM at a magnification of 5,000 for acquisition of an SEM image SI having dimensions of, for example, about 25 μm×about 18 μm. As shown in FIG. 4, trisectors L1 and L2 (in a width direction) are drawn in the SEM image SI, to thereby specify ion conductor particles 10 through which the trisectors L1 and L2 pass (e.g., to specify 10 particles 10 marked with circled FIGS. 1 to 10 as shown in FIG. 4).

As shown in FIG. 5, each of the particles 10 specified on the SEM image SI is selected as a target particle 10S. Two orthogonal straight lines 11 and 12 are drawn so as to pass the center GP of the target particle 10S, and straight lines 13 and 14 are drawn so as to pass the center GP and to incline by 45° with respect to the straight lines 11 and 12, respectively. Intersection points between the circumferential line of the target particle 10S and the four straight lines 11, 12, 13, and 14 are specified as measurement points MP. In the case where only a portion of the circumferential line of the target particle 10S is shown in the SEM image SI, measurement points MP are specified only in a shown region.

Each of the specified measurement points MP is observed under an SEM at a magnification of 100,000, and one half of the distance between the measurement point MP and an intersection point SP (i.e., a point between any of the straight lines 11, 12, 13, and 14 passing through the measurement point MP and the adjacent particle 10, only one intersection point SP is shown in FIG. 5) is determined as the thickness of the ionic liquid 20 at the measurement point MP. In the case where the ionic liquid 20 is absent at the measurement point MP, the thickness of the ionic liquid 20 is regarded as zero. The thickness of the ionic liquid 20 at each measurement point MP in each SEM image SI, and the average of the thicknesses of the ionic liquid 20 at all the measurement points MP is defined as the average thickness t1 of the ionic liquid 20.

When the amount of the ionic liquid added, the amount of the lithium ion conductive powder added, and the particle size distribution (particle size d (μm) and frequency f (%)) of the powder are known or can be measured, the average thickness t1 of the ionic liquid may be determined through a method described below. Firstly, the particle size distribution of the lithium ion conductive powder is acquired or measured. The particle size distribution is measured by means of, for example, SALD-2300 (product of Shimadzu Corporation) and by using water as a solvent and Triton X-100 as a dispersant. The powder is dispersed through ultrasonic treatment for one minute.

Each particle of the lithium ion conductive powder is regarded as being spherical, and the surface area S1 and volume V1 per powder particle and the occupied volume V2 per $cm^3$ are calculated on the basis of the particle size d of each particle according to the following formulae.

Surface area $S1$ $(m^2)$ per powder particle $= 4\times\pi\times(d/2/10^6)^2$

Volume $V1$ $(cm^3)$ per powder particle $= (4/3)\times\pi\times(d/2/10^4)^3$

Occupied volume $V2$ $(cm^3)$ per $cm^3 = f/100\times 1$

The number N and surface area S2 of particles of the lithium ion conductive powder per $cm^3$ are calculated.

Number $N$ of powder particles per cm$^3$=$V2/V1$

Total surface area $S2$ (m$^2$) of powder particles per cm$^3$=$S1\times N$

The total surface area $S3$ (m$^2$) (i.e., the sum of the total surface areas $S2$ (m$^2$) calculated on the basis of all the particle sizes d) is divided by the total volume $V3$ (cm$^3$) (=1 cm$^3$) (i.e., the sum of the occupied volumes $V2$ (cm$^3$) per cm$^3$ calculated on the basis of all the particle sizes d) and the density of the lithium ion conductive powder (g/cm$^3$), to thereby determine the specific surface area $S4$ (m$^2$/g) of the lithium ion conductive powder. The specific surface area $S4$ is multiplied by the amount (g) of the lithium ion conductive powder added, to thereby determine the total surface area $S5$ (m$^2$) of the lithium ion conductive powder added. Separately, the amount (g) of the ionic liquid added is divided by the density of the ionic liquid, to thereby calculate the volume $V4$ (cm$^3$) of the ionic liquid added. The volume $V4$ of the ionic liquid is divided by the surface area $S5$ of the lithium ion conductive powder, to thereby determine the average thickness t1 of the ionic liquid.

Average thickness t1 (nm) of ionic liquid=$V4\times 1000/S5$

It has been confirmed that the average thickness t1 of the ionic liquid calculated on the basis of the amount and particle size distribution of the lithium ion conductive powder added is generally consistent with the average thickness t1 of the ionic liquid determined through the aforementioned SEM observation.

A-4-2. Method for Determining Porosity of Lithium Ion Conductor

The porosity of the lithium ion conductor is determined as described below. Firstly, a sample is cooled to −100° C., and a test piece having dimensions of 5 mm or less×5 mm or less×3 mm or less (thickness) is cut out of the sample. The test piece is subjected to FIB processing to thereby provide a dent having dimensions of 50 μm×50 μm×20 μm (thickness). While the wall of the dent is cooled at −100° C., the wall is observed under an SEM at a magnification of 5,000 for acquisition of SEM images at any three positions. In each SEM image, the area of pores is determined by subtracting the area of the lithium ion conductor and the area of the ionic liquid from the area of the entire image. The ratio of the area of pores to the area of the entire image is regarded as porosity. The average of the porosities determined at the measurement positions is defined as the porosity of the lithium ion conductor.

In the case where the lithium ion conductor can be removed from the complete-solid battery 102, the porosity may be determined through the Archimedes method.

When the amount of the lithium ion conductive powder added and the amount of the ionic liquid added are already known, the porosity of the lithium ion conductor may be determined through a method described below. Specifically, the apparent density ρa and theoretical density ρ of the lithium ion conductor are calculated according to the following formulae. The apparent density ρa is divided by the theoretical density ρ, and the resultant value is defined as the porosity.

Apparent density ρa(g/cm$^3$)=sample weight (g)/sample volume (cm$^3$)

Theoretical density ρ(g/cm$^3$)=(the amount (g) of lithium ion conductive powder added+the amount (g) of ionic liquid added)/{(the amount (g) of lithium ion conductive powder added/the density (g/cm$^3$) of lithium ion conductive powder)+(the amount (g) of ionic liquid added/the density (g/cm$^3$) of ionic liquid)}

A-5. Preferred Embodiment of LLZ Ion Conductive Powder

As described above, the lithium ion conductor of the present embodiment contains an LLZ ion conductive powder (ion conductive powder having a garnet structure or a garnet-like structure containing at least Li, La, Zr, and O). The LLZ ion conductive powder preferably contains at least one element selected from the group consisting of Mg, Al, Si, Ca (calcium), Ti, V (vanadium), Ga (gallium), Sr, Y (yttrium), Nb (niobium), Sn (tin), Sb (antimony), Ba (barium), Hf (hafnium), Ta (tantalum), W (tungsten), Bi (bismuth), and lanthanoids. The LLZ ion conductive powder having such a composition exhibits good lithium ion conductivity.

Preferably, the LLZ ion conductive powder contains at least one of Mg and element A (A represents at least one element selected from the group consisting of Ca, Sr, and Ba), and these elements satisfy the following mole ratio conditions (1) to (3). Mg and element A are present in relatively large amounts in the earth and inexpensive. Thus, when Mg and/or element A is used as a substitution element for the LLZ ion conductive powder, the LLZ ion conductive powder is expected to be reliably supplied and produced at low cost.

$$1.33\leq Li/(La+A)\leq 3; \tag{1}$$

$$0\leq Mg/(La+A)\leq 0.5; \text{ and} \tag{2}$$

$$0\leq A/(La+A)\leq 0.67. \tag{3}$$

More preferably, the LLZ ion conductive powder contains both Mg and element A and these elements satisfy the following mole ratio conditions (1') to (3'):

$$2.0\leq Li/(La+A)\leq 2.5; \tag{1'}$$

$$0.01\leq Mg/(La+A)\leq 0.14; \text{ and} \tag{2'}$$

$$0.04\leq A/(La+A)\leq 0.17. \tag{3'}$$

In other words, the LLZ ion conductive powder preferably satisfies any of the following (a) to (c), more preferably (c), still more preferably (d).

(a) The LLZ ion conductive powder contains Mg, and the amounts of the elements satisfy the mole ratio conditions: $1.33\leq Li/La\leq 3$ and $0\leq Mg/La\leq 0.5$.

(b) The LLZ ion conductive powder contains element A, and the amounts of the elements satisfy the mole ratio conditions: $1.33\leq Li/(La+A)\leq 3$ and $0\leq A/(La+A)\leq 0.67$.

(c) The LLZ ion conductive powder contains Mg and element A, and the amounts of the elements satisfy the mole ratio conditions: $1.33\leq Li/(La+A)\leq 3$, $0\leq Mg/(La+A)\leq 0.5$, and $0\leq A/(La+A)\leq 0.67$.

(d) The LLZ ion conductive powder contains Mg and element A, and the amounts of the elements satisfy the mole ratio conditions: $2.0\leq Li/(La+A)\leq 2.5$, $0.01\leq Mg/(La+A)\leq 0.14$, and $0.04\leq A/(La+A)\leq 0.17$.

When the LLZ ion conductive powder satisfies the aforementioned (a); i.e., when the LLZ ion conductive powder contains Li, La, Zr, and Mg so as to satisfy the aforementioned mole ratio conditions: (1) and (2), the LLZ ion conductive powder exhibits good lithium ion conductivity. Although the mechanism therefor has not clearly been elucidated, a conceivable reason is as follows. In the case where, for example, the LLZ ion conductive powder contains Mg, the ionic radius of Li is almost equivalent to that of Mg, and thus Mg is readily placed in Li sites where Li is originally present in the LLZ crystal phases. When Mg replaces Li, pores are generated at some Li sites in the crystal structure, due to the difference in amount of electric charge between Li and Mg, thereby conceivably enhancing the mobility of Li ions. As a result, lithium ion conductivity may be improved. In the LLZ ion conductive powder, when the mole ratio of Li to the sum of La and element A is smaller than 1.33 or greater than 3, a metal oxide other than the ion conductive powder having a garnet-type or garnet-like crystal structure is readily formed. An increase in the metal oxide content leads to a relative decrease in the amount of the ion conductive powder having a garnet-type or garnet-like crystal structure. Since the metal oxide has low lithium ion conductivity, the lithium ion conductivity of the LLZ ion conductive powder is reduced. An increase in the Mg content of the LLZ ion conductive powder leads to placement of Mg in Li sites and generation of pores at some Li sites, resulting in an improvement in lithium ion conductivity. When the mole ratio of Mg to the sum of La and element A is in excess of 0.5, an Mg-containing metal oxide is readily formed. An increase in the Mg-containing metal oxide content leads to a relative decrease in the amount of the ion conductive powder having a garnet-type or garnet-like crystal structure. The Mg-containing metal oxide has low lithium ion conductivity. Thus, when the mole ratio of Mg to the sum of La and element A is in excess of 0.5, the lithium ion conductivity of the LLZ ion conductive powder is reduced.

When the LLZ ion conductive powder satisfies the aforementioned (b); i.e., when the LLZ ion conductive powder contains Li, La, Zr, and element A so as to satisfy the aforementioned mole ratio conditions (1) and (3), the LLZ ion conductive powder exhibits good lithium ion conductivity. Although the mechanism therefor has not clearly been elucidated, a conceivable reason is as follows. In the case where, for example, the LLZ ion conductive powder contains element A, the ionic radius of La is almost equivalent to that of element A, and thus element A is readily placed in La sites where La is originally present in the LLZ crystal phases. When element A replaces La, the crystal lattice deforms, and free Li ions increase due to the difference in amount of electric charge between La and element A, thereby conceivably improving lithium ion conductivity. In the LLZ ion conductive powder, when the mole ratio of Li to the sum of La and element A is smaller than 1.33 or greater than 3, a metal oxide other than the ion conductive powder having a garnet-type or garnet-like crystal structure is readily formed. An increase in the metal oxide content leads to a relative decrease in the amount of the ion conductive powder having a garnet-type or garnet-like crystal structure. Since the metal oxide has low lithium ion conductivity, the lithium ion conductivity of the LLZ ion conductive powder is reduced. An increase in the element A content of the LLZ ion conductive powder leads to placement of element A in La sites. As a result, the lattice deformation increases, and free Li ions increase due to the difference in amount of electric charge between La and element A, thereby improving lithium ion conductivity. When the mole ratio of element A to the sum of La and element A is in excess of 0.67, an element A-containing metal oxide is readily formed. An increase in the element A-containing metal oxide leads to a relative decrease in the amount of the ion conductive powder having a garnet-type or garnet-like crystal structure. Since the element A-containing metal oxide has low lithium ion conductivity, the lithium ion conductivity of the LLZ ion conductive powder is reduced.

The aforementioned element A is at least one element selected from the group consisting of Ca, Sr, and Ba. Ca, Sr, and Ba are group 2 elements defined in the relevant periodic table, and readily form divalent cations. These elements have almost the same ionic radius. Since the ionic radius of each of Ca, Sr, and Ba is almost the same as that of La, La elements present in the La sites of the LLZ ion conductive powder are readily substituted with Ca, Sr, or Ba. Among these elements A, Sr is preferred, since the LLZ ion conductive powder containing Sr can be readily sintered to thereby achieve high lithium ion conductivity.

When the LLZ ion conductive powder satisfies the aforementioned (c); i.e., when the LLZ ion conductive powder contains Li, La, Zr, Mg, and element A so as to satisfy the aforementioned mole ratio conditions (1) to (3), the ion conductive powder can be readily sintered, to thereby achieve further improved lithium ion conductivity. When the LLZ ion conductive powder satisfies the aforementioned (d); i.e., when the LLZ ion conductive powder contains Li, La, Zr, Mg, and element A so as to satisfy the aforementioned mole ratio conditions (1') to (3'), the lithium ion conductivity is further improved. Although the mechanism therefor has not clearly been elucidated, a conceivable reason is as follows. In the LLZ ion conductive powder, when, for example, Li in Li sites is substituted by Mg, and La in La sites is substituted by element A, pores are generated at some Li sites, and free Li ions increase. As a result, the lithium ion conductivity may be further improved. More preferably, the LLZ ion conductive powder contains Li, La, Zr, Mg, and Sr so as to satisfy the aforementioned conditions (1) to (3) (in particular (1') to (3')), since, in this case, the resultant lithium ion conductor has high lithium ion conductivity and high relative density.

In any of the aforementioned conditions (a) to (d), the LLZ ion conductive powder preferably contains Zr so as to satisfy the following mole ratio condition (4). When Zr is contained under the condition (4), an ion conductive powder having a garnet-type or garnet-like crystal structure can be readily produced.

$$0.33 \leq Zr/(La+A) \leq 1 \tag{4}$$

A-6. Performance Evaluation

Figure 6:
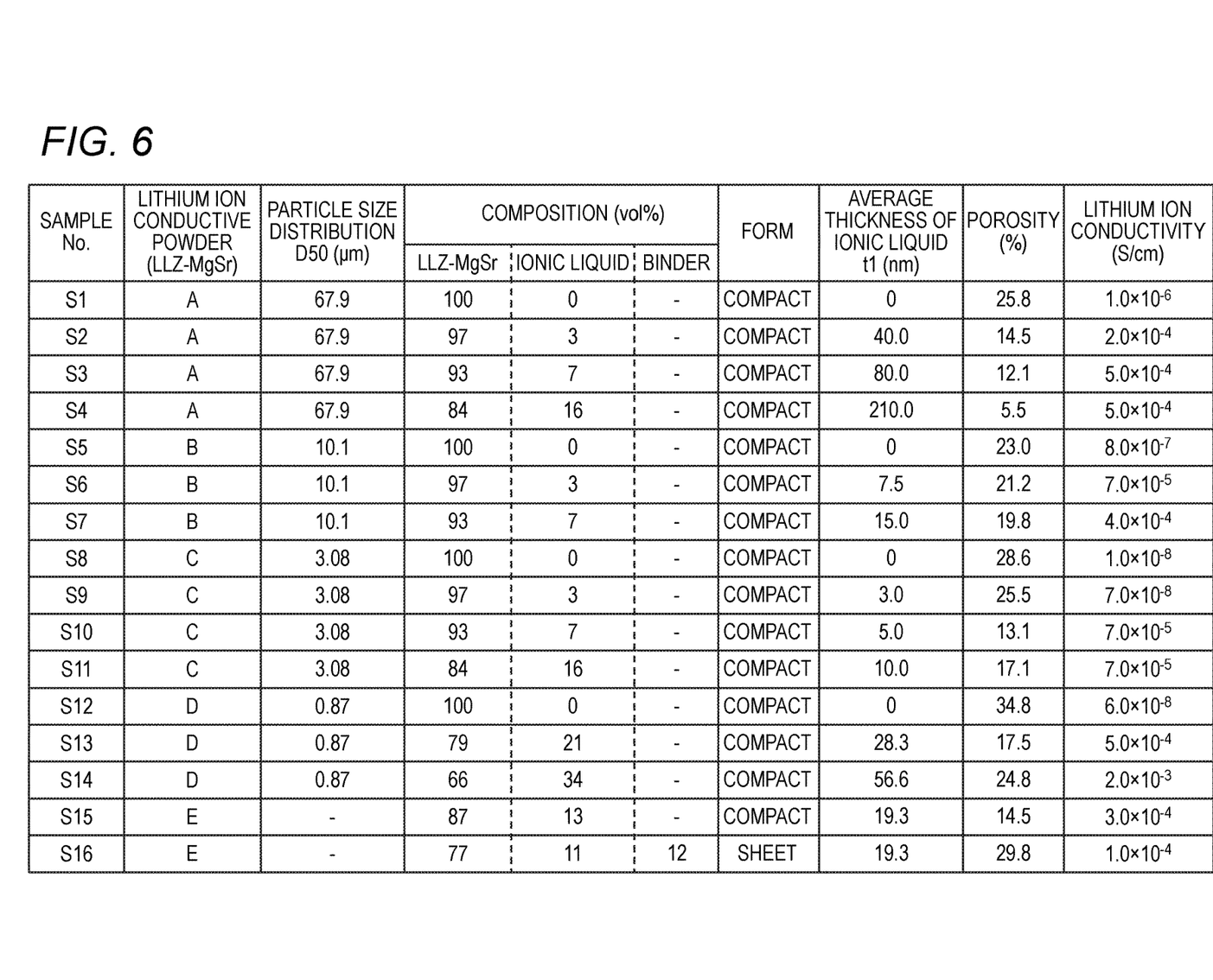
FIG. 6 Explanatory view showing the results of performance evaluation.
Figure 7:
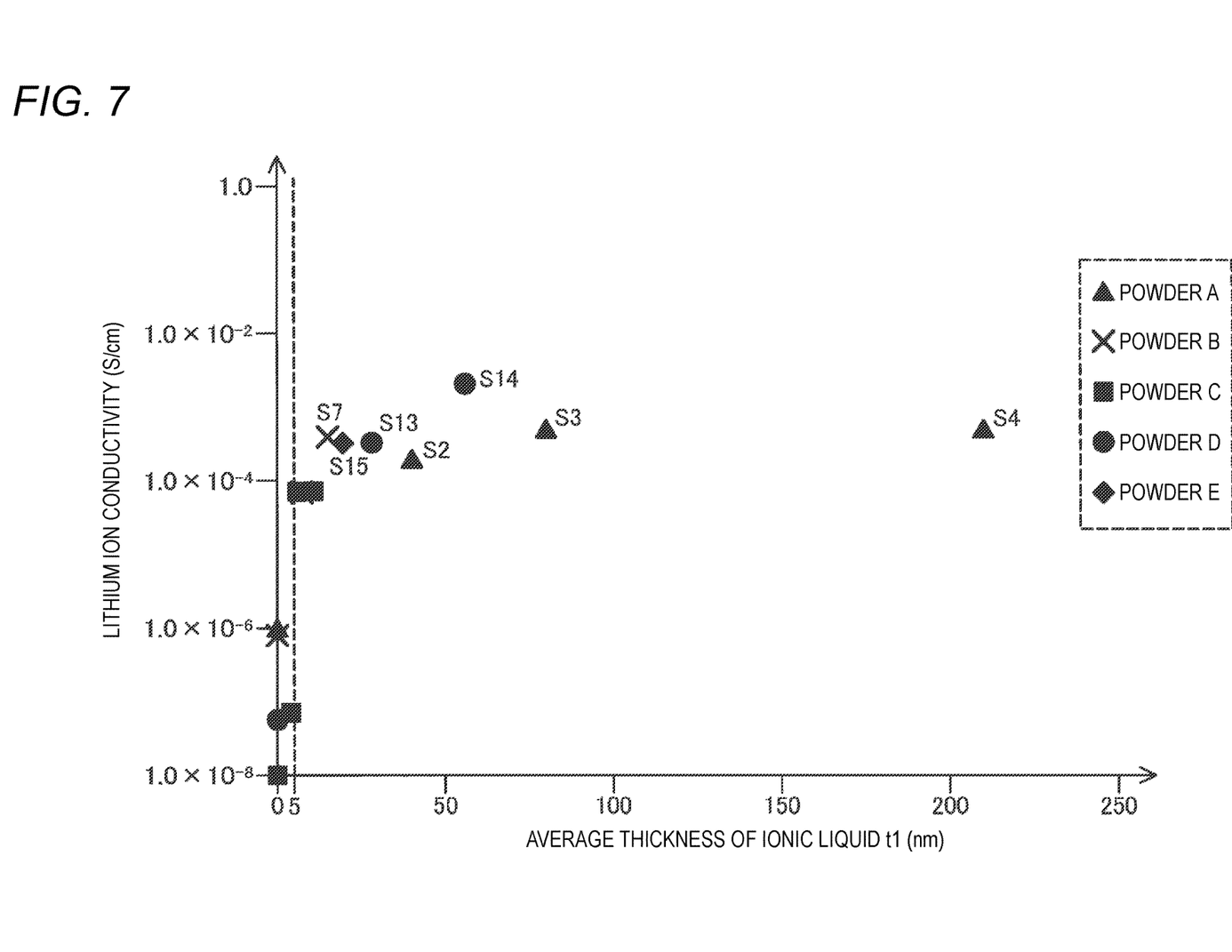
FIG. 7 Explanatory view showing the results of performance evaluation.
Figure 8:
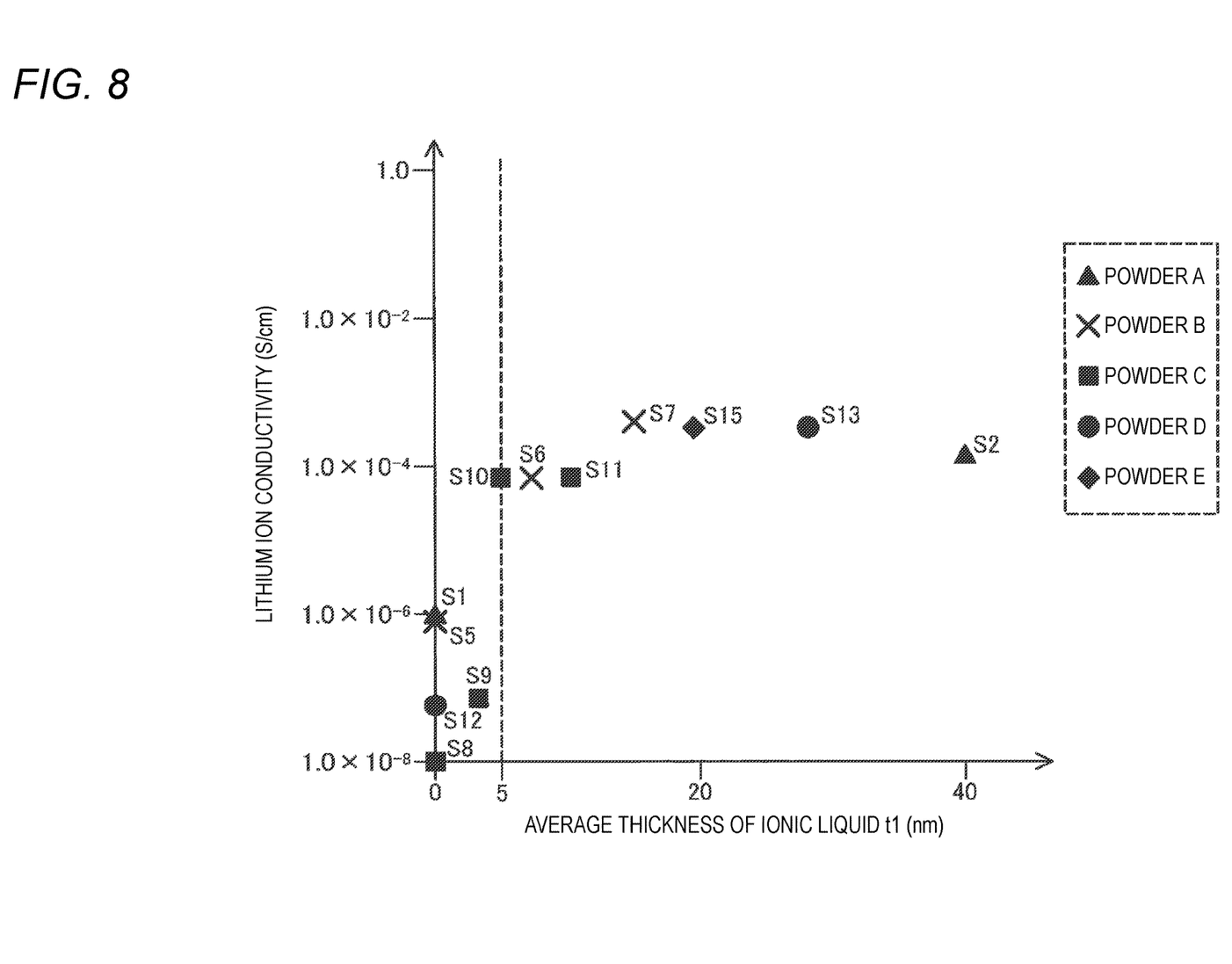
FIG. 8 Explanatory view showing the results of performance evaluation.
Figure 9:
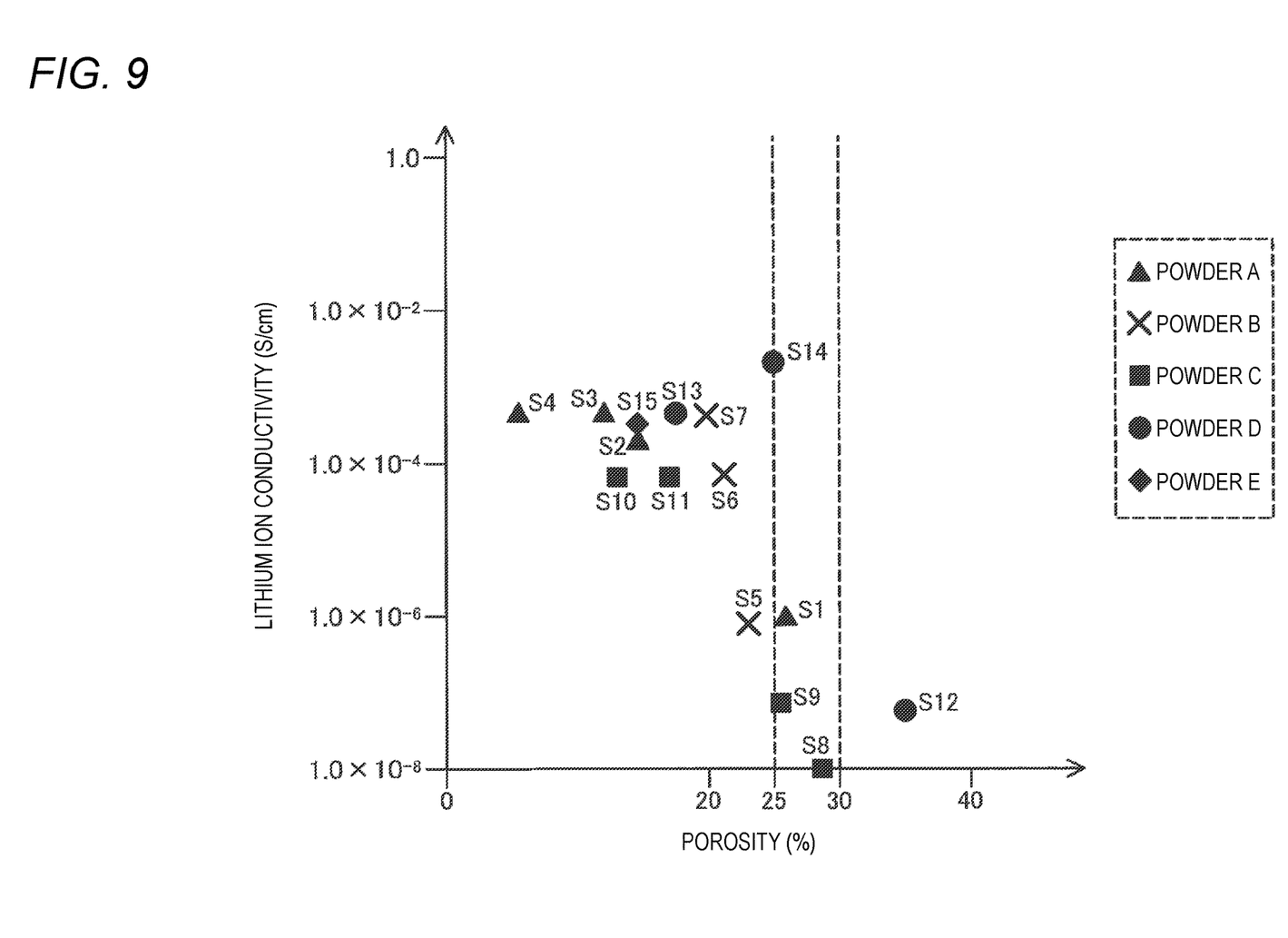
FIG. 9 Explanatory view showing the results of performance evaluation.

A lithium ion conductor was evaluated for lithium ion conductivity. FIGS. 6 to 9 are explanatory views showing the results of performance evaluation. FIG. 6 is a table showing the structures and properties of samples. FIGS. 7 and 8 each are a graph showing the relationship between the average thickness t1 of an ionic liquid and the lithium ion conductivity of a lithium ion conductor. FIG. 8 magnifies a region in which the average thickness t1 of an ionic liquid is 40 nm or less. FIG. 9 is a graph showing the relationship between the porosity and lithium ion conductivity of a lithium ion conductor.

(Samples)

As shown in FIG. 6, 16 lithium ion conductor samples (S1 to S16) were used for performance evaluation. These samples contain different types of lithium ion conductive powders, and the lithium ion conductive powders have different particle size distributions, compositions, and forms. Therefore, the ionic liquids contained in the samples have different average thicknesses t1, and the samples have different porosities.

Specifically, each of the samples contains LLZ-MgSr powder as a lithium ion conductive powder. As shown in FIG. 6, five types (A to E) of LLZ-MgSr powder were used in these samples.

Each LLZ-MgSr powder was prepared as described below. Specifically, $Li_2CO_3$, MgO, $La(OH)_3$, $SrCO_3$, and $ZrO_2$ were weighed so as to achieve a composition of $Li_{6.95}Mg_{0.15}La_{2.75}Sr_{0.25}Zr_{2.0}O_{12}$ (LLZ-MgSr). In consideration of volatilization of Li during firing, $Li_2CO_3$ was further added so that the amount of elemental Li was in excess by about 15 mol %. These raw materials were added to a nylon pot together with zirconia balls, and the resultant mixture was pulverized by means of a ball mill in an organic solvent for 15 hours. Thereafter, the resultant slurry was dried and then calcined on an MgO plate at 1,100° C. for 10 hours. A binder was added to the calcined powder, and the mixture was subjected to pulverization by means of a ball mill in an organic solvent for 15 hours. Thereafter, the resultant slurry was dried, and the dried material was added to a mold having a diameter of 12 mm. The material was press-molded so as to have a thickness of about 1.5 mm, and then the molded product was pressed at an isostatic pressure of 1.5 t/cm$^2$ by means of a cold isostatic pressing (CIP) machine, to thereby form a compact. The compact was covered with a calcination powder having the same composition as that of the compact and fired in a reducing atmosphere at 1,100° C. for 4 hours, to thereby yield a sintered body. The sintered body was found to have a lithium ion conductivity of $1.0 \times 10^{-3}$ S/cm. The sintered body was pulverized in a glove box with an argon atmosphere, to thereby prepare an LLZ-MgSr powder.

Type A was prepared by passing the LLZ-MgSr powder through a 250-μm sieve. Type B was prepared by passing the LLZ-MgSr powder through a 63-μm sieve. Type C was prepared by pulverizing the LLZ-MgSr powder by means of a ball mill using φ4 zirconia balls at 200 rpm for 30 minutes. Type D was prepared by pulverizing the LLZ-MgSr powder by means of a ball mill using φ4 zirconia balls at 300 rpm for 180 minutes.

Type E was prepared by mixing the LLZ-MgSr powder of type C and the LLZ-MgSr powder of type D in proportions by volume of 80:20.

Thus, these samples contain different types of lithium ion conductive powder (LLZ-MgSr powder). Therefore, as shown in FIG. 6, the samples exhibit different particle size distributions D50 of lithium ion conductive powder.

As shown in FIG. 6, regarding the composition of lithium ion conductive powder, the amounts (by volume) of the lithium ion conductive powder (LLZ-MgSr powder) or the ionic liquid are different among the samples. The ionic liquid used was EMI-FSI (LiTFSI) (i.e., a lithium-salt-dissolved ionic liquid) prepared by mixing EMI-FSI (product of Wako Pure Chemical Industries, Ltd.) with Li-TFSI (product of Kojundo Chemical Laboratory Co., Ltd.) as a lithium salt (0.8 mol/L). Each of the lithium ion conductors of samples S1, S5, S8, and S12 is formed only of a lithium ion conductive powder and does not contain an ionic liquid.

The lithium ion conductors of samples S1 to S15 are in the form of a compact. Regarding these samples, LLZ-MgSr powder (lithium ion conductive powder) and EMI-FSI (LiTFSI) (ionic liquid) (total: 0.5 g) were mixed by means of a mortar in predetermined volume proportions (different among samples) in an argon atmosphere, to thereby prepare a powder compound of LLZ-MgSr and EMI-FSI (LiTFSI). As described above, this powder compound was replaced with LLZ-MgSr powder in samples S1, S5, S8, and S12. In an argon atmosphere, the above-prepared powder compound (only LLZ-MgSr powder was used in samples S1, S5, S8, and S12, the same shall apply hereinafter) was added to an insulating tube having a diameter of 10 mm, and a pressure of 500 MPa was vertically applied to the tube for press molding, to thereby form a molded product (compact) of lithium ion conductor.

Meanwhile, sample S16 contains a binder and is in the form of a sheet. Regarding this sample, LLZ-MgSr powder and EMI-FSI (LiTFSI) (total: 0.5 g) were mixed by means of a mortar in predetermined volume proportions in an argon atmosphere, to thereby prepare a powder compound of LLZ-MgSr and EMI-FSI (LiTFSI). In an argon atmosphere, the thus-prepared powder compound was mixed with a PVDF-HFP binder and an organic solvent by means of a mortar, and the mixture was formed into a film on an aluminum foil (thickness: 20 μm) by means of an applicator (clearance: 500 μm), followed by drying under reduced pressure at 70° C. for 1 hour, to thereby prepare a sheet containing LLZ-MgSr and EMI-FSI (LiTFSI). In an argon atmosphere, the resultant sheet was added to an insulating tube having a diameter of 10 mm, and a pressure of 500 MPa was vertically applied to the tube for press molding, to thereby form a molded product (sheet) of lithium ion conductor.

In each sample, the average thickness t1 of the ionic liquid and the porosity of the lithium ion conductor were calculated by the aforementioned methods. In each sample, the molded product of lithium ion conductor was screw-fixed with a torque of 8 N by means of a pressing jig, and the lithium ion conductivity of the molded product was measured at room temperature (25° C.).

(Results of Performance Evaluation)

As shown in FIGS. 6 to 8, samples S1, 5, 8, and 12 formed only of the lithium ion conductive powder (LLZ-MgSr powder) exhibited a low lithium ion conductivity of $1.0 \times 10^{-6}$ S/cm or less. Meanwhile, sample S9 containing the lithium ion conductive powder and the ionic liquid (EMI-FSI(LiTFSI)) (in which the average thickness t1 of the ionic liquid was less than 5 nm) exhibited a low lithium ion conductivity of $7.0 \times 10^{-8}$ S/cm.

In contrast, samples S2, 3, 4, 6, 7, 10, 11, and 13 to 16 each containing the lithium ion conductive powder and the ionic liquid (in which the average thickness t1 of the ionic liquid was 5 nm or more) exhibited a lithium ion conductivity of $1.0 \times 10^{-5}$ S/cm or more, which was higher than the lithium ion conductivity of the sample formed only of the lithium ion conductive powder or the sample containing the lithium ion conductive powder and the ionic liquid (in which the average thickness t1 of the ionic liquid was less than 5 nm). The results indicated that a lithium ion conductor containing a lithium ion conductive powder and an ionic liquid (in which the average thickness t1 of the ionic liquid is 5 nm or more) exhibits a high lithium ion conductivity ($1.0 \times 10^{-5}$ S/cm or more at 25° C.) only through press molding without firing.

Sample S16 (i.e., a lithium ion conductor containing a binder and being in the form of a sheet) exhibited a high lithium ion conductivity of $1.0 \times 10^{-4}$ S/cm. The results suggest that a lithium ion conductor containing a binder and being in the form of a sheet exhibits a high lithium ion conductivity when the lithium ion conductor contains both a lithium ion conductive powder and an ionic liquid and the average thickness t1 of the ionic liquid is 5 nm or more.

As shown in FIGS. 6 and 9, samples S2, 3, 4, 6, 7, 10, 11, and 13 to 16 exhibited a porosity of 30% or less and a relatively high lithium ion conductivity ($1.0 \times 10^{-5}$ S/cm or more at 25° C.). The results indicate that the porosity of the lithium ion conductor is preferably 30% or less.

B. Modifications

The technique disclosed in the present specification is not limited to the aforementioned embodiment, but may be modified into various other forms without departing from the gist thereof. For example, the technique may be modified as described below.

The configuration of the complete-solid battery 102 described in the aforementioned embodiment is a mere example, and may be modified into various forms. For example, in the aforementioned embodiment, the lithium ion conductor containing the LLZ ion conductive powder and the ionic liquid having lithium ion conductivity is contained in all of the solid electrolyte layer 112, the cathode 114, and the anode 116. However, the lithium ion conductor may be contained in at least one of the solid electrolyte layer 112, the cathode 114, and the anode 116.

In the aforementioned embodiment, the lithium ion conductors 202, 204, and 206 contain an LLZ ion conductive powder. However, the lithium ion conductors 202, 204, and 206 may contain another lithium ion conductive powder in place of or in addition to the LLZ ion conductive powder. Examples of the additional lithium ion conductive powder are as follows:

(1) solid electrolyte materials having a NASICON structure containing at least Li and M (M is at least one of Ti, Zr, and Ge (germanium)), P (phosphorous), and O (e.g., (Li, Ti, Al)($PO_4$)$_3$, $LiZr_2(PO_4)_3$, and (Li, Ge, Al)($PO_4$)$_3$);

(2) solid electrolyte materials having a perovskite structure containing at least Li, Ti, La, and O (e.g., (La, Li)$TiO_3$);

(3) solid electrolyte materials having an antiperovskite structure containing at least Li, Cl, and O (e.g., $Li_2$(OH)Cl); and (4) complex hydrides.

The technique disclosed in the present specification is not limited to the solid electrolyte layer or electrode forming the complete-solid battery 102, but can also be applied to a solid electrolyte layer or electrode forming another lithium battery (e.g., a lithium-air battery or a lithium flow battery).

REFERENCE SIGNS LIST

10: particle; 20: ionic liquid; 102: complete-solid lithium ion secondary battery; 110: battery body; 112: solid electrolyte layer; 114: cathode; 116: anode; 154: cathode-side collector member; 156: anode-side collector member 202: lithium ion conductor; 204: lithium ion conductor; 206: lithium ion conductor; 214: cathode active material; 216: anode active material; CP: dent; GP: center; MP: measurement point; SI: SEM image; SP: intersection point; and W1: wall

What is claimed is:

1. An ion conductor comprising an ion conductive powder having lithium ion conductivity,
    characterized in that the ion conductor further comprises an ionic liquid having lithium ion conductivity, and
    the ionic liquid has an average thickness of 5 nm to 210 nm.

2. An ion conductor according to claim 1, which has a porosity of 30% to 5.5%.

3. An ion conductor according to claim 1, wherein
    the ion conductive powder has a garnet structure or a garnet-like structure containing at least Li, La, Zr, and O.

4. An ion conductor according to claim 1, which has a lithium ion conductivity of $1.0 \times 10^{-5}$ S/cm to $2.0 \times 10^{-3}$ at 25° C.

5. A power storage device comprising a solid electrolyte layer, a cathode, and an anode, wherein at least one of the solid electrolyte layer, the cathode, and the anode comprises the ion conductor as recited in claim 1.

6. An ion conductor sheet comprising the ion conductor according to claim 1, further comprising a binder.

7. A method for producing the ion conductor sheet as recited in claim 6, the method comprising:
    mixing the ion conductive powder with the ionic liquid, to thereby prepare a powder compound; and
    after the mixing step, forming the ion conductor sheet from a mixture of the powder compound and a binder.

* * * * *